Sept. 14, 1948.   P. R. STOUT ET AL   2,449,517
CONICAL SCANNING ERROR REDUCTION DEVICE
Filed Oct. 19, 1945   2 Sheets-Sheet 1
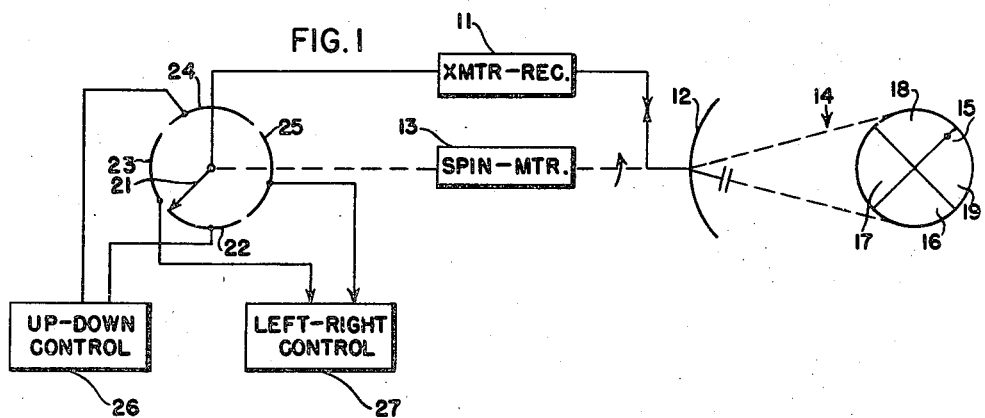
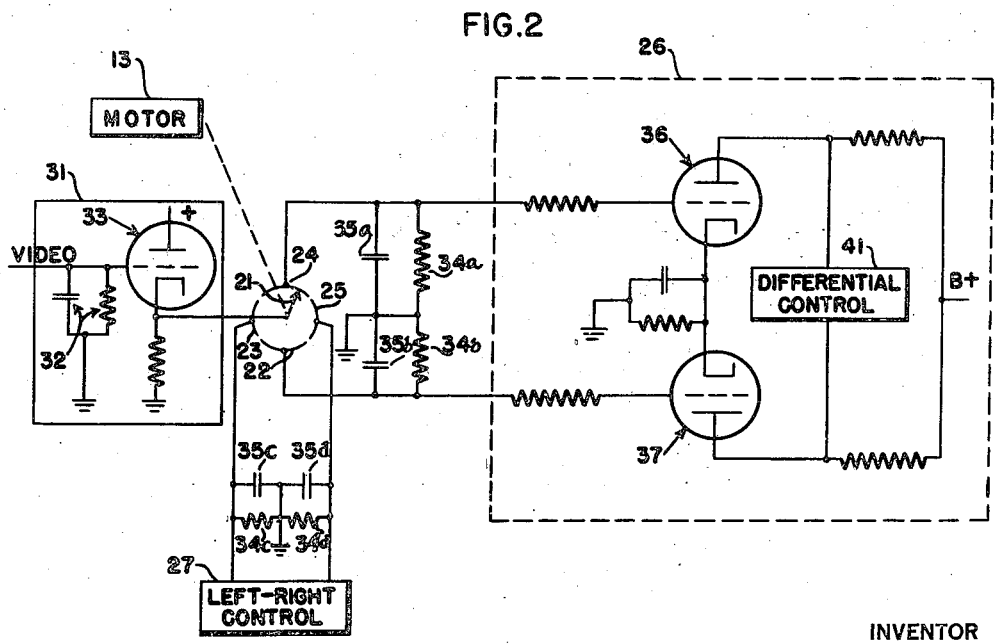
INVENTOR
PERRY R. STOUT
WILLIAM J. TULL
BY
William D. Hall,
ATTORNEY Patented Sept. 14, 1948

2,449,517

UNITED STATES PATENT OFFICE 2,449,517

CONICAL SCANNING ERROR REDUCTION DEVICE

Perry R. Stout, Washington, D. C., and William J. Tull, Cambridge, Mass., assignors, by mesne assignments, to the United States of America as represented by the Secretary of War Application October 19, 1945, Serial No. 623,408

1 Claim. (Cl. 343—120)

This invention relates to radio object-locating systems employing conical scanning and more particularly to the reduction of errors in the interpretation of the amplitude modulation of echoes returned from a selected target in such a system.

In accordance with conventional practice conical scanning, that is, searching a prescribed cone in space by rotation of a radiating device the major axis of the field pattern of which is angularly displaced from the axis of rotation, is used to obtain information regarding the position of a selected target relative to the axis of rotation of the antenna. This positional information may be used to indicate the relative target position on a cathode ray tube employing so called C-type presentation, to actuate a crossed-pointer type of meter for indicating such relative position or for causing the radiating device to point in such a direction that the axis of rotation thereof passes through the target. In most of the above enumerated cases the amplitudes of the several pulses or signals reflected from the target as the major axis of the field pattern rotates, are modulated in proportion to the distance of the target 15 from the axis of rotation and at the frequency of rotation. These modulations can be detected and integrated to provide a direct-current potential which is a function of the mean value thereof. By comparison of the resultant D.-C. potentials obtained from two opposite quadrants, the sense and magnitude of the displacement of the target from the axis of rotation of the antenna along a line through the center of the two quadrants may be determined. From the remaining pair of quadrants the sense and magnitude of the displacement along a line at right angles to the first-mentioned line may likewise be determined. The quadrants are normally chosen so that the displacements determined are up-down (elevation) and right-left (azimuth). As is well understood in the art, however, there is an inherent phase shift in the modulating signal which is introduced by the detecting circuit in demodulating the transmitted signal. This phase lag results from the storage of voltage on the detector condenser necessary to change the pulse voltages as nearly as possible to the envelope voltage. The average voltages are delayed by about one-half the pulse interval, noticeable as a decreased average voltage when pulse voltages are increasing or constant and an unchanged average voltage when pulse voltages are decreasing at the maximum rate permitted by a proper time constant of the detector circuit. This undesired phase shift produces an error in indicated displacement, and when this displacement is used to cause the antenna to be directed toward the target, instability of operation is introduced. In such cases where the indicated displacement is used on a C-type indicator or on a crossed-pointer type meter, the aforementioned phase shift produces an error in the indicated position.

It is an object of the present invention, therefore, to provide a means whereby the error in indicated displacement is eliminated.

For a better understanding of the invention, together with other and further objects thereof, reference is had to the following description taken in connection with the accompanying drawing in which:

Fig. 1 is a block diagram of a radio object-locating system employing the present invention;

Fig. 2 is a detailed wiring diagram of a portion of the system of Fig. 1 illustrating the present invention;

Figure 3:
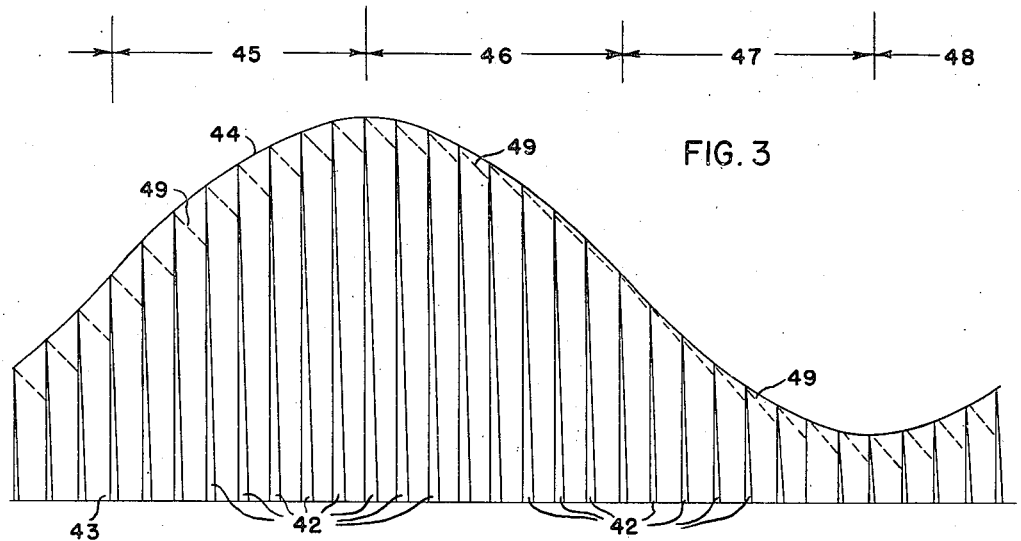
Fig. 3 illustrates certain waveforms pertinent to the present invention.

Referring now to the drawing and more particularly to Fig. 1 thereof, there is shown a radio object-locating system comprising a transmitter-receiver 11 electrically connected to an antenna 12 which is caused to rotate by a spinner motor 13. The antenna 12 is electrically or mechanically eccentric to produce a conical search zone 14 in which there is located a target 15. The zone 14 may be thought of as divided into quadrants 16, 17, 18 and 19. The output of the receiver portion of the transmitter-receiver 11 is connected to a brush 21 which contacts commutator segments 22, 23, 24 and 25 as it is rotated by the motor 13. The segments 22 and 24 receive signals when the antenna 12 searches in quadrants 16 and 18, respectively, and transfer these signals to an up-down control circuit 26. The segments 23 and 25, receive signals when the antenna 12 searches in quadrants 17 and 19, respectively, and transfer these signals to a right-left control circuit 27. The control circuits 26 and 27 may consist of differential amplifiers or other devices well known to the art whose outputs may be adapted in a well known manner to perform any of the desired functions enumerated above.

Reference is now had to Fig. 2 of the drawing in which there is shown a detector 31 connected to the commutator brush 21 which is rotated by motor 13. The detector 31 detects the amplitude modulation of the video return echo of the selected target 15.

The detector 31 may be any conventional detector well known in the art but is here shown to comprise a low-pass filter 32 in the grid circuit of a conventional cathode follower output stage 33. Direct coupling is employed between the cathode follower 33 and the commutator brush 21. Segments 22 and 24 of the commutator are severally returned to ground through a parallel combination of a resistor $34_b$ or $34_a$ and a corresponding capacitor $35_b$ or $35_a$, the purpose of which will be explained later. Segments 23 and 25 are similarly connected to ground through capacitor $35_c$ or $35_d$ and a corresponding resistor $34_c$ or $34_d$ as shown. The segments 22 and 24 also serve as the input to the up-down control circuit 26. The control circuit 26 may be any type well known in the art but is here shown as a differential amplifier consisting of amplifiers 36 and 37, the outputs of which connect to a differential control 41. The control 41 may be a differential relay which is essentially a polarity sensitive relay controlling a double-throw switch, or it may be a zero-center meter or a part of a servo system. It will be understood that the commutator segments 23 and 25 feed the left-right control circuit 27 in a manner similar to that in which the segments 22 and 24 feed the up-down control circuit 26.

Figure 4:
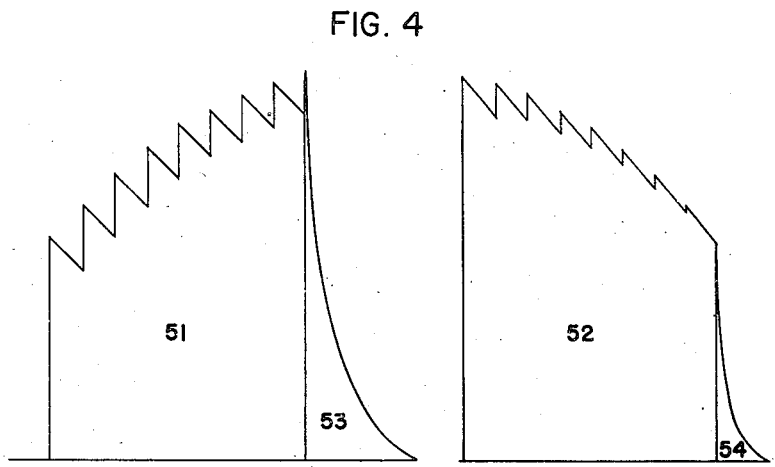
Fig. 4 illustrates other waveforms pertinent to the invention.

In the description of the operation of the circuit of Fig. 2 reference will be had to Figs. 3 and 4. In Fig. 3 triangular pulses 42 which rise above some reference line 43 represent the video pulses returned by a selected target. If the target 15, Fig. 1, is off the center axis of the antenna 12, Fig. 1, the amplitude of the returned signals will vary in a nearly sinusoidal manner. A solid curve 44 represents the envelope of the amplitude modulation of the pulses 42. From a study of Figs. 1 and 2, together with the indicated direction of rotation of the motor 13, it will be seen that the pulses 42 in the time interval 45, Fig. 3, are returned while the antenna 12 searches the quadrant 18 in a clockwise direction. In a similar fashion it can be shown that intervals 46, 47, and 48 correspond respectively to quadrants 19, 16, and 17. The video pulses 42 are passed through the detector 31, Fig. 2, and the resultant waveform at the brush 21 is as indicated by the dashed line 49. The jagged waveform 49 is due primarily to the necessary design of the low-pass filter in the detector 31, Fig. 2. In Fig. 4 area 51 is the area which will be integrated in quadrant 18 under space 45, Fig. 3, while area 52 is the area in quadrant 19 under space 46, Fig. 3. It will be noted that these areas, 51 and 52, are not equal, area 52 being the larger, due to the slope of the discharge curves 49 between peaks of pulses 42 as seen from a geometrical consideration of the patterns produced by the slope whereas the target 15, Fig. 1, actually lies exactly between the two quadrants 18 and 19 and the areas should be equal. The inequality is due to the loss of area between the modulating curve 44 and the peaks of 42 and the slopes 49. In the case of the ascending peaks considerable area is lost whereas in the case of the descending peaks, relatively little area is lost. From the curve 49, Fig. 3, it will also be noted that the area integrated in quadrant 16, under space 47, Fig. 3, is greater than the area integrated in quadrant 17 under area 48, Fig. 3. It will be obvious to those skilled in the art that the indication of target position derived from the above will be inaccurate. It is, therefore, proposed to remedy the situation by the insertion of the capacitor 35 from each commutator segment to ground. There will then be a charge stored on this capacitor at the end of each quadrant which, as it discharges through the resistor 34, will add to the area to be integrated in the desired manner. Noting Fig. 4, areas 53 and 54 represent areas added by capacitor 35, respectively, to areas 51 and 52. The area 53 may be made to exceed the area 54 by the proper amount to make area 51 plus area 53 equal to area 52 plus area 54 by proper choice of capacitors 35 $(a—d)$ and resistors 34 $(a—d)$. Due also to this compensation the total areas integrated during spaces 47 and 48, Fig. 3, will also be equal. Correspondingly any two areas taken from opposite quadrants when the target is not displaced towards either quadrant are balanced, and no false reading will result from this inherent error, and correct indication of target position will result. In the illustration here shown the target was assumed up and to the left at 45°, however, it will be noted that if the capacitor 35 and the associated resistor 34 are properly chosen, the compensation will be manifest without regard to target position. It will also be noted that the invention herein described works equally well and does not depend upon the direction of rotation of the antenna, whereas without compensation the resulting error is a function of direction of rotation.

While there has been described what is at present considered the preferred embodiment of the invention, it will be obvious to those skilled in the art that various changes and modifications may be made therein without departing from the invention.

What is claimed is:

In a radio object-locating system employing conical scanning for the production of voltages related to each other in accordance with the coordinates of a selected target relative to the system and employing a single-brush four-segment commutator for analysis of the signals returned in four quadrants, a compensating device comprising first, second, third and fourth capacitors respectively connected between the four commutator segments and a common ground point, and first, second, third and fourth resistors respectively connected in parallel with said first, second, third, and fourth capacitors whereby the average voltages on the commutator segments may be indicative of the true position of the target.

PERRY R. STOUT.
WILLIAM J. TULL.

REFERENCES CITED

The following references are of record in the file of this patent:

UNITED STATES PATENTS

| Number | Name | Date |
|---|---|---|
| 2,089,956 | Harding | Aug. 17, 1937 |
| 2,392,420 | Steinhoff | Jan. 8, 1946 |
| 2,405,930 | Goldberg | Aug. 13, 1946 |